United States Patent
Werberg et al.

(10) Patent No.: US 12,246,339 B2
(45) Date of Patent: Mar. 11, 2025

(54) FIXTURE UNIT FOR HOLDING A PRISMATIC BATTERY CELL

(71) Applicant: Volvo Car Corporation, Gothenburg (SE)

(72) Inventors: Leopold Werberg, Gothenburg (SE); Marcus Schmidt, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 36 days.

(21) Appl. No.: 18/116,371

(22) Filed: Mar. 2, 2023

(65) Prior Publication Data
US 2023/0311156 A1 Oct. 5, 2023

(30) Foreign Application Priority Data
Apr. 5, 2022 (EP) .................................. 22166843

(51) Int. Cl.
*B05B 12/20* (2018.01)
*B05B 13/02* (2006.01)
*B05C 9/14* (2006.01)
*B05C 13/02* (2006.01)
*B05C 21/00* (2006.01)
(Continued)

(52) U.S. Cl.
CPC .............. *B05C 13/02* (2013.01); *B05B 12/20* (2018.02); *B05B 13/0285* (2013.01); *B05C 9/14* (2013.01); *B05C 21/005* (2013.01); *H01M 10/04* (2013.01); *B05D 3/067* (2013.01); *H01M 50/103* (2021.01);
(Continued)

(58) Field of Classification Search
None
See application file for complete search history.

(56) References Cited

U.S. PATENT DOCUMENTS 4,319,543 A * 3/1982 Shank ..................... B05B 12/20
118/301
6,387,183 B1 * 5/2002 Inaba ..................... B05B 12/20
118/301
(Continued)

FOREIGN PATENT DOCUMENTS

CN 212120686 U 12/2020
EP 3696875 A1 8/2020
(Continued)

OTHER PUBLICATIONS

Dec. 14, 2023 Extended European Search Report issued in corresponding EP Application No. 23178412.
(Continued)

*Primary Examiner* — Binu Thomas
(74) *Attorney, Agent, or Firm* — Clements Bernard Walker; Christopher L. Bernard (57) ABSTRACT

A fixture unit for holding a prismatic battery cell during a coating step and during a curing step, including: at least one skirt element, which is movable between a coating position and a curing position and wherein the skirt element is configured to shield an area of the battery cell in the coating position and to un-shield the area of the battery cell in the curing position; and at least one grip element configured to hold the battery cell during the coating step and the curing step, wherein the grip element is configured to hold the battery cell in the area that is shielded by the skirt element in its coating position.

12 Claims, 6 Drawing Sheets

(51) Int. Cl.
*B05D 3/06* (2006.01)
*H01M 10/04* (2006.01)
*H01M 50/103* (2021.01)
*H01M 50/124* (2021.01)

(52) U.S. Cl.
CPC .... *H01M 50/1245* (2021.01); *H01M 2220/20* (2013.01)

(56) References Cited

U.S. PATENT DOCUMENTS

| | | |
|---|---|---|
| 6,468,350 B1 | 10/2002 | Hillenbrand |
| 2015/0306798 A1 | 10/2015 | Feng-Yuen et al. |
| 2017/0250388 A1 | 8/2017 | Unno et al. |
| 2022/0143645 A1* | 5/2022 | Doll .................... B05B 13/0431 |

FOREIGN PATENT DOCUMENTS

| | | |
|---|---|---|
| JP | 2007248644 A | 9/2007 |
| KR | 20140099846 A | 8/2014 |
| WO | 2018003994 A1 | 1/2018 |
| WO | 2020262085 A1 | 12/2020 |

OTHER PUBLICATIONS

Sep. 19, 2022 European Search Report issued in corresponding EP Application No. 22166843.

* cited by examiner

FIXTURE UNIT FOR HOLDING A PRISMATIC BATTERY CELL

CROSS-REFERENCE TO RELATED APPLICATION

The present disclosure claims the benefit of priority of co-pending European Patent Application No. 22 166 843.7, filed on Apr. 5, 2022, and entitled "FIXTURE UNIT FOR HOLDING A PRISMATIC BATTERY CELL," the contents of which are incorporated in full by reference herein.

TECHNICAL FIELD

The present disclosure relates to a fixture unit for holding a prismatic battery cell during a coating step and during a curing step, a method for coating a prismatic battery cell, a respective system, a use of a battery cell in such a method and a vehicle including a battery cell provided according to such a method.

BACKGROUND

In the prior art, battery cells for electrical vehicles are known. These battery cells are coated with a UV curable insulation coating, so that the battery cells can be arranged in contact with each other and other components without having to provide additional electrical insulation. This allows a very dense and more flexible arrangement of the battery cells in a vehicle. Such a UV coating is usually sprayed using an aerosol gun and does not cure/dry over time and/or in an oven as a normal paint, but rather must be exposed to UV light to trigger the curing. It has been found that when removing respective masks or covers, the coating often crack in an undesired and unpredictable way.

In view of this, it has been found that there is a further need to simplify the coating of a battery cell with a UV curable electrical insulation coating.

SUMMARY

In the view of the above, it is an object of the present disclosure to simplify the coating of a battery cell with a UV curable electrical insulation coating.

According to a first aspect, a fixture unit for holding a prismatic battery cell during a coating step and during a curing step, including: at least one skirt element, which is movable between a coating position and a curing position and wherein the skirt element is configured to shield an area of the battery cell in the coating position and to un-shield the area of the battery cell in the curing position; at least one grip element configured to hold the battery cell during the coating step and the curing step, wherein the grip element is configured to hold the battery cell in the area of the battery cell that is shielded by the skirt element in its coating position.

In other words, the present disclosure provides a fixture unit for holding a prismatic battery cell during a coating step and during a curing step, wherein the skirt element is in a coating position while the coating is sprayed onto the cell, but then moved/retracted to a curing position when the UV light is applied for curing such that the skirt element is not in contact with the battery cell any more. This movable skirt element may be quickly moved between its positions without hindering other operations allowing a quick and efficient process that would otherwise require multiple steps. Thus, a solution can be provided where the battery cell can be gripped and masked, but prevents the coating from curing on the fixture unit or the interface between the fixture unit and the battery cell. The cell then receives coating simultaneously exactly where desired without these undesired consequences. As a result, the present disclosure describes a new dynamic way of holding and masking the battery cell allowing a coating of all six sides without sacrificing the transport and masking needs. The present disclosure allows to simultaneously coat all six sides of a prismatic battery cell with an insulative coating which can mechanically bond to the battery cell.

The term "fixture unit" is to be understood broadly in the present case and relates to any means configured to hold/secure/mount a battery cell during a coating and a curing step. The term "battery cell" is to be understood broadly in the present case and relates to any essentially prismatic battery cell, e.g. an essentially rectangular shape. Shielding an area of the battery cell in the coating position means that no coating may get onto this shielded area, wherein un-shielding the area of the battery cell in the curing position means that the skirt is not in contact with the applied coating and the battery cell any more. The term "skirt element" is to be understood broadly in the present case and relates to any means which may be moved between the coating position and curing position, e.g. the skirt element may also be provided by a two-piece "clam shell" or that it folds up and/or moves in from the sides to form a skirt. The term "grip element" is to be understood broadly in the present case and relates to any means allowing to hold the battery cell during coating and curing, wherein the term hold is to be understood broadly in this respect and encompasses in particular gripping, resting, supporting, a form-fit and/or force-fit connection of the grip element and the battery cell. The features/elements of a battery cell which should usually not be coated are in particular the terminal elements, the vent(s), QR codes etc. The term "shielded" means that the corresponding area of the battery cell is covered/protected by the skirt element in such a way that no coating can get onto the shielded area during the coating step. Typically, the coating is typically applied from the sides of the battery cell by a spray nozzle or similar means, which is guided around an axis of the battery cell.

Notably, any disclosure and implementations described herein relate to the methods and the apparatuses/units/devices, lined out above or below and vice versa. The benefits provided by any of the aspects, implementations and examples equally apply to all other aspects, implementations and examples and vice versa.

As used herein "determining" also includes "initiating or causing to determine", "generating" also includes "initiating and/or causing to generate" and "providing" also includes "initiating or causing to determine, generate, select, send and/or receive". "Initiating or causing to perform an action" includes any processing signal that triggers a computing node or device to perform the respective action.

In an implementation, in its coating position, the skirt element may be in contact with the battery cell and in its curing position, the skirt element may be positioned at a distance from the battery cell. In an example, the battery cell may be placed on the fixture unit and moved (e.g. by means of a moving belt) through a spray booth/station where the battery cell may be sprayed with a coating. During coating, the skirt element may be in contact with the battery cell and covers the area of the battery cell that is not to be coated. In one example, the area of the battery cell that is not to be coated is located at the bottom. The fixture unit with the coated battery cell is then moved (e.g. by means of a moving belt) from the spray boot/station to the curing station. In the curing station, the skirt element is in its curing position, which is provided at a distance from the battery cell. This distance is adjusted in such a way that the curing means (e.g. UV light) may reach the applied coating also near the shielded area of the battery cell. In an example, the distance between the battery cell and the skirt element in its curing position may be between 5 mm and 30 mm, preferably between 10 mm and 25 mm and most preferably approximately 10 mm.

In an implementation, the grip element may include at least one tong element which is configured such that a protruding terminal element of a battery cell can be held or supported by the at least one tong element. In this respect, the tong element may merely receive the terminal element such that the terminal element rests within the tong element. In an example, tong element can be configured in such a way as to provide a form-fitting and/or force-fitting connection between the tong element and the terminal element of the battery cell.

In an implementation, the grip element may include at least one gripper tong element configured to grip a protruding terminal element of a battery cell. In an example, the gripper tong element may include spring elements or other means providing a corresponding force load for gripping a terminal element of the battery cell.

In an implementation, the grip element may include at least one suction mechanism including at least one suction cup configured to hold a battery cell.

In an implementation, the grip element may include at least one block element configured to be position between two terminal elements of a battery cell such that the battery cell can be held or supported by the at least one block element. The block element may be configured in such a way that the battery cell rests on the block element, e.g. without contacting the terminal elements of the battery cell. The block element may also be designed in such a way that the block element is frictionally clamped/arranged between the terminal element of the battery cell.

In an implementation, the grip element may be include at least one gripper block element configured to be position between two terminal elements of a battery cell such that the battery cell can be gripped by the at least one gripper block element. In an example, the gripper tong element may include one or more spring elements or other means providing a corresponding force load for gripping the gripper block element between the terminal elements of the battery cell.

In an implementation, the fixture unit may include at least two grip elements. This allows that a grip element may be provided at a respective terminal element of the battery cell in order to be able to provide a particularly safe arrangement. In an example, the fixture unit may include two different grip elements or two identical grip elements.

In an implementation, the skirt element may be configured to mask a rectangular area of a side of the battery cell, where the terminal elements and other features of the battery cell are arranged. The features/elements of a battery cell which should usually not be coated are in particular the terminal elements, the vent(s), QR codes etc.

In an implementation, the skirt element may have a rectangular cross section having a length between 60 mm and 540 mm, preferably approximately 260 mm, and width between 10 mm and 50 mm, preferably approximately 20 mm.

In an implementation, the fixture unit may be configured to hold a prismatic battery cell having a length between 100 mm and 600 mm, preferably approximately 300 mm, a width between 10 mm and 50 mm, preferably approximately 30 mm and a height between 80 mm and 150 mm, preferably approximately 110 mm.

In an implementation, the fixture unit may further include a moving mechanism configured to move the skirt element between the coating position and the curing position. A moving mechanism in the present case means any mechanism that may be used to move the skirt element back and forth between coating first position and curing second position. In one example, the moving mechanism may be a rack and pinion drive or the like. In addition, the moving mechanism may include more active versions, controlled electrically or pneumatically.

A further aspect relates to a method for coating a prismatic battery cell with a coating, including: providing a battery cell hold by a fixture unit according as described above; coating the battery cell with a coating, wherein the skirt element is positioned in its coating position; curing the coating, wherein the skirt element is positioned in its curing position.

A further aspect of the present disclosure relates to a system including a fixture unit as described above and battery cell held by the fixture unit.

A further aspect of the present disclosure relates to a use of a battery cell in a method as described above. In this respect use of a battery cell means that the battery cell is coated by means of the method described above.

A further aspect relates to a vehicle including at least one battery cell coated according a method as described above.

BRIEF DESCRIPTION OF THE DRAWINGS

In the following, the disclosure is described exemplarily with reference to the enclosed figures, in which.

Notably, the figures are merely schematic representations and serve only to illustrate examples of the present disclosure. Identical or equivalent elements are in principle provided with the same reference signs.

DETAILED DESCRIPTION

UV cured dielectric coatings are used in the industry to electrically insulate prismatic battery cells, which have a six sided rectangular shape. Such insulative coatings may only reach five of the six sides, as the $6^{th}$ side including the terminal elements and other features of the battery cell is typically used to transport the cell through the process and is masked to protect it from overspray. The present disclosure describes a new dynamic way of holding and masking the battery cell allowing a coating of all six sides without sacrificing the transport and masking needs. The present disclosure allows to simultaneously coat all six sides of a prismatic battery cell with an insulative coating which can mechanically bond to the battery cell.

Figure 1:
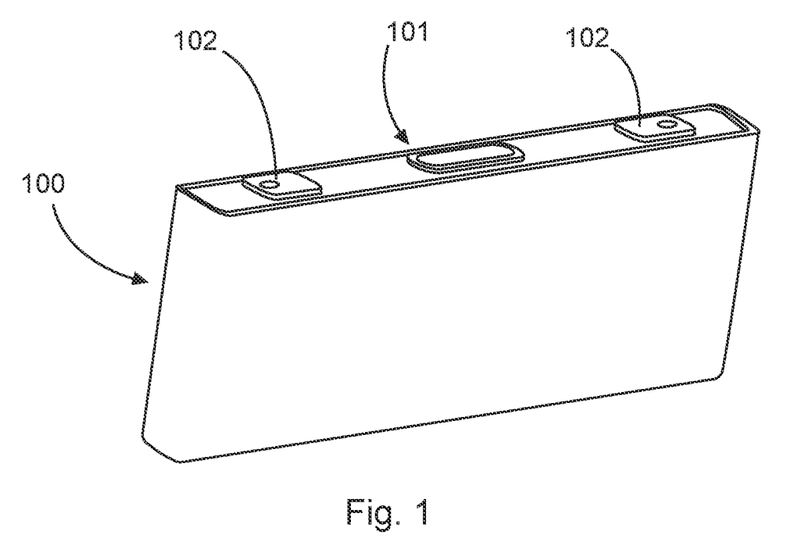
FIG. 1 is a schematic view of an uncoated battery cell.
Figure 2:
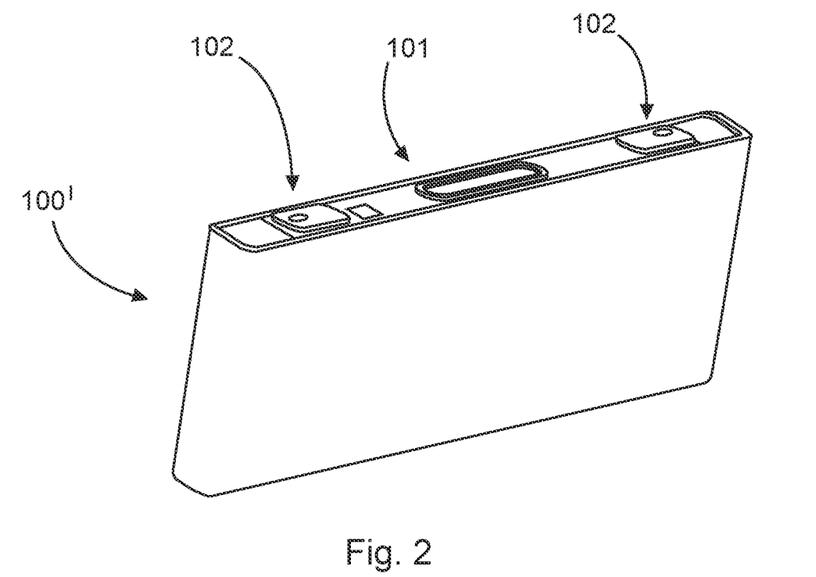
FIG. 2 is a schematic view of a coated battery cell.

FIG. 1 is a schematic view of an uncoated battery cell 100. The battery cell 100 includes two terminal elements 102 and further features/elements, e.g. the vent(s), QR codes etc., which should usually not be coated. The terminal elements 102 and the further features/elements are arranged in an area 101 at one side of the battery cell. FIG. 2 is a schematic view of a coated battery cell 100'.

Figure 3:
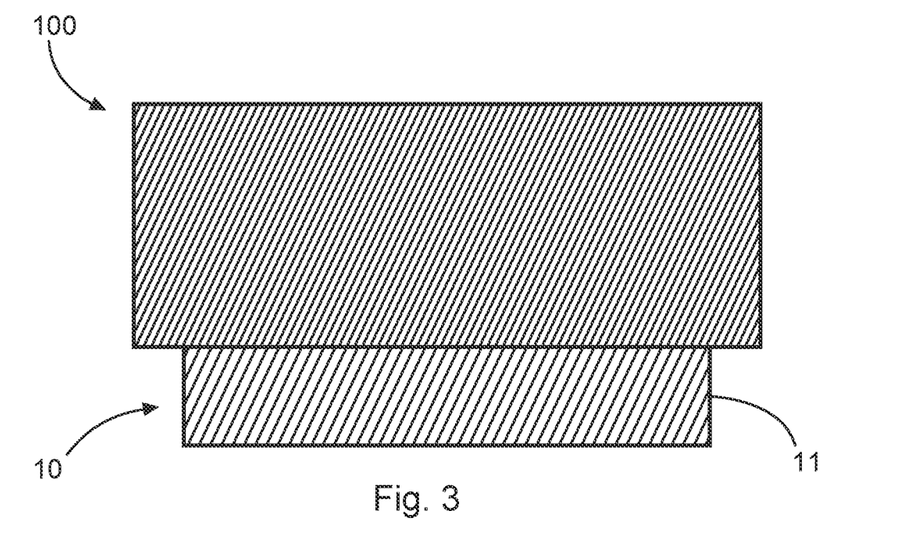
FIG. 3 is a schematic view of a fixture unit with a skirt element in the coating position according to an example of the present disclosure.
Figure 4:
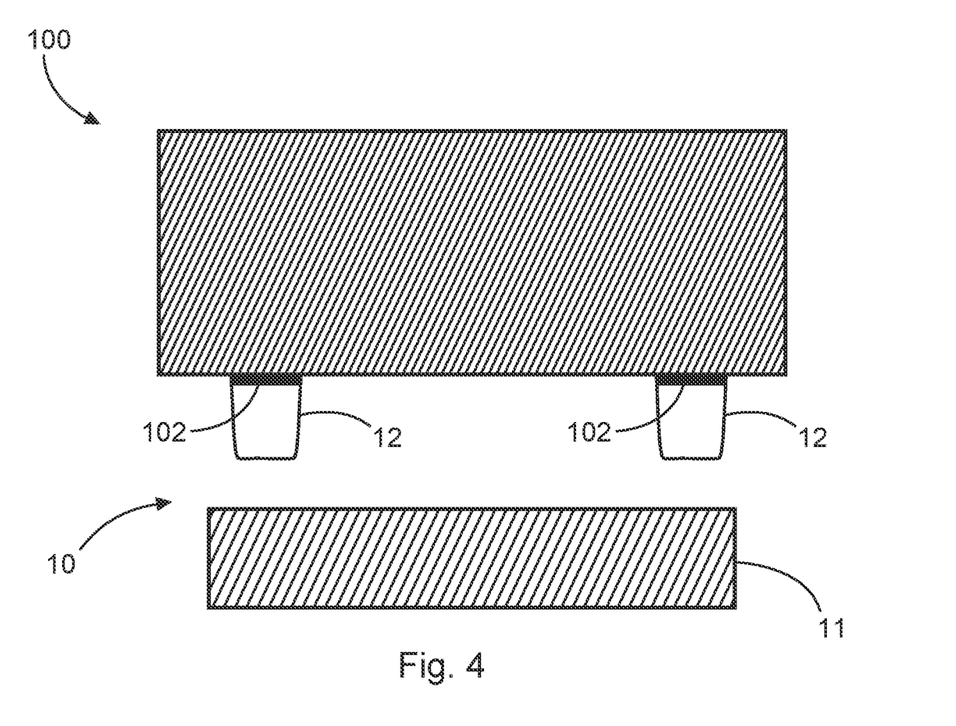
FIG. 4 is a schematic view of the fixture unit of FIG. 3 with the skirt element in the curing position.

FIGS. 3 and 4 are schematic views of a fixture unit 10 with a skirt element 11 according to an example of the present disclosure, wherein in FIG. 3, the skirt element 11 is shown in its coating position and in FIG. 4, the skirt element 11 is shown in its curing position. As shown, the fixture unit 10 is used for holding the prismatic battery cell 100 during a coating step and during a curing step. The skirt element 11 is movable between the coating position (cf. FIG. 3) and the curing position (cf. FIG. 4). The skirt element 11 is configured to shield the area 101 of the battery cell 100 in the coating position and to un-shield the area 101 of the battery cell 100 in the curing position.

The fixture unit 10 shown in FIGS. 3 and 4 is further including two grip elements 12 configured to hold the battery cell 100 during the coating step and the curing step, wherein the grip elements are configured to hold the battery cell 100 in the area 101 of the battery cell 100 that is shielded by the skirt element 11 in its coating position (cf. FIG. 4). The grip elements 12 are provided as tong elements 12 which are configured such that the respective protruding terminal element 102 of the battery cell 100 can be held or supported by the tong element 12. The tong elements 12 may merely receive the terminal elements 102 such that the terminal element 102 rests within the tong elements 12. The tong elements 12 may be configured in such a way as to provide a form-fitting and/or force-fitting connection between the tong elements 12 and the terminal elements 102 of the battery cell 100.

The fixture unit 10 may further include a moving mechanism (not shown) configured to move the skirt element 11 between the coating position and the curing position. A moving mechanism may be provided by any mechanism that may be used to move the skirt element 11 back and forth between coating position and curing position. In one example, the moving mechanism may be a rack and pinion drive or the like.

FIGS. 5 to 8 show further examples of the grip elements. In all other aspects, these examples correspond to the example discussed above, so that what has been explained above also applies to these examples.

Figure 5:
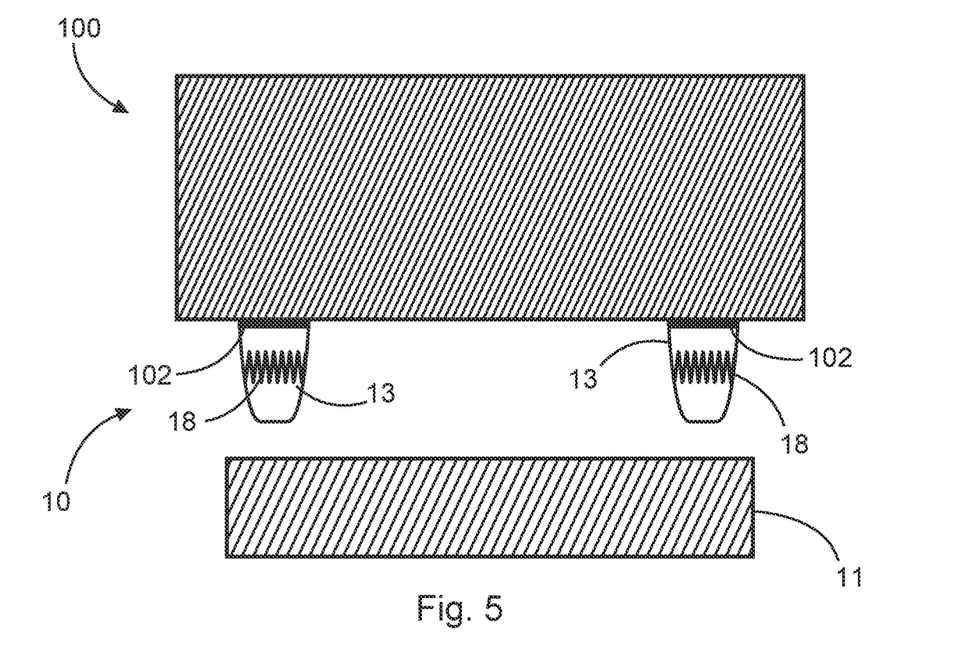
FIG. 5 is a schematic view of a fixture unit with a skirt element in the curing position according to a further example of the present disclosure.

FIG. 5 is a schematic view of a fixture unit 10 with a skirt element 11 in the curing position according to a further example of the present disclosure. In this example, the grip elements are provided by gripper tong elements 13 configured such that the protruding terminal elements 102 of the battery cell 100 can be gripped by the gripper tong elements 13. In this respect, the gripper tong elements 13 may include respective spring elements 18 or other means providing a corresponding force load for gripping the terminal elements 102 of the battery cell 102 providing a force-fit connection between the gripper tong elements 13 and the terminal elements 102 of the battery cell 100.

Figure 6:
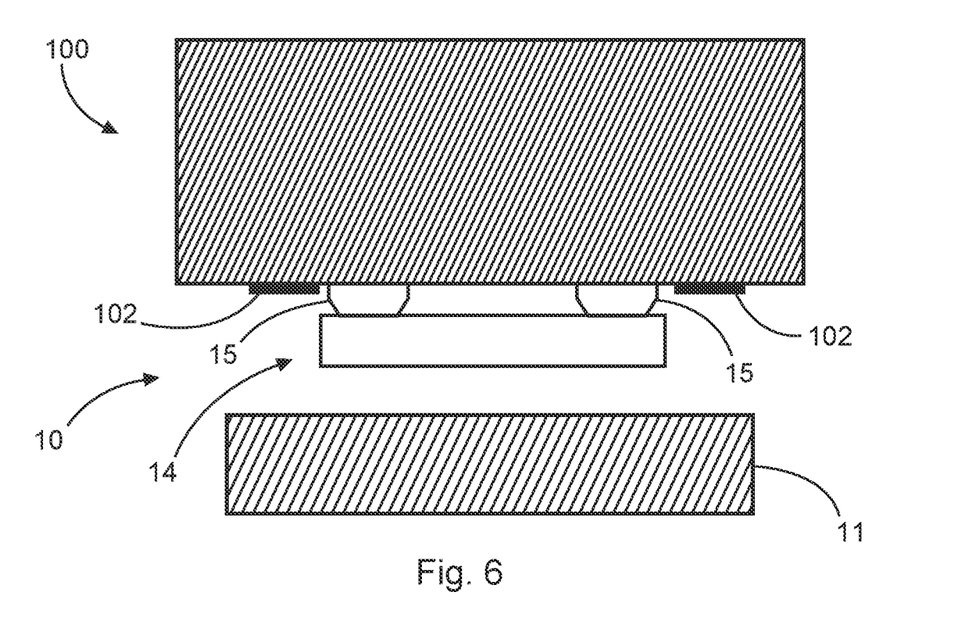
FIG. 6 is a schematic view of a fixture unit with a skirt element in the curing position according to a further example of the present disclosure.

FIG. 6 is a schematic view of a fixture unit 10 with a skirt element 11 in the curing position according to a further example of the present disclosure. In this example, the grip elements are provided by a suction mechanism 14 including two suction cups 15 configured to hold the battery cell 100 at the area 102 of the battery cell 100.

Figure 7:
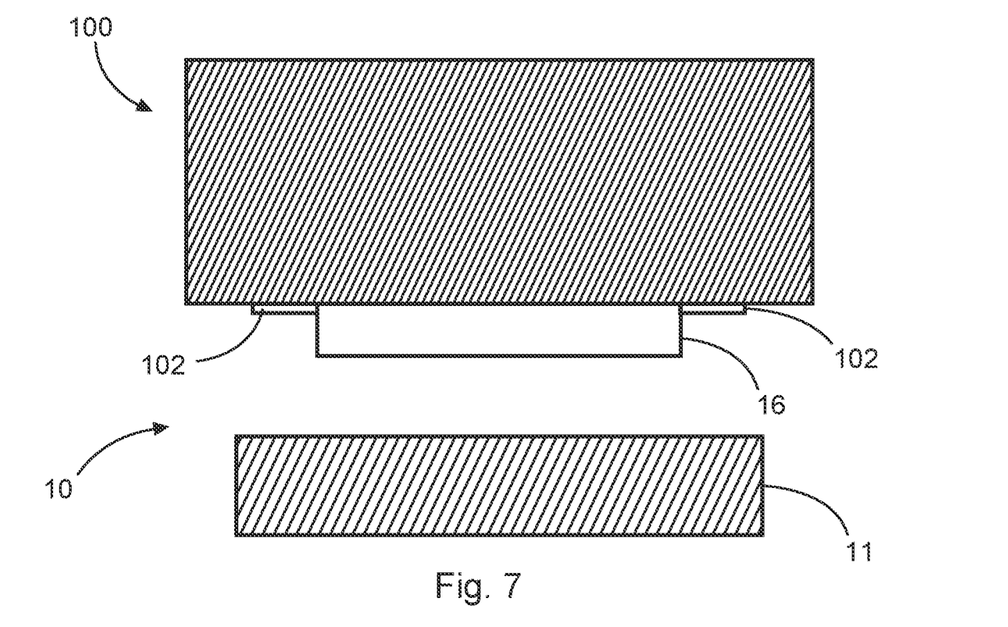
FIG. 7 is a schematic view of a fixture unit with a skirt element in the curing position according to a further example of the present disclosure.

FIG. 7 is a schematic view of a fixture unit 10 with a skirt element 11 in the curing position according to a further example of the present disclosure. In this example, the grip element is provided by a block element 16 configured to be positioned between the two terminal elements 102 of the battery cell 100 such that the battery cell 100 can be held or supported by the block element 16. The block element 16 may be configured in such a way that the battery cell 100 rests on the block element 16, e.g. without contacting the terminal elements 102 of the battery cell 100. The block element 16 may also be designed in such a way that the block element 100 is frictionally clamped/arranged or form-fitted between the terminal elements 102 of the battery cell 100.

Figure 8:
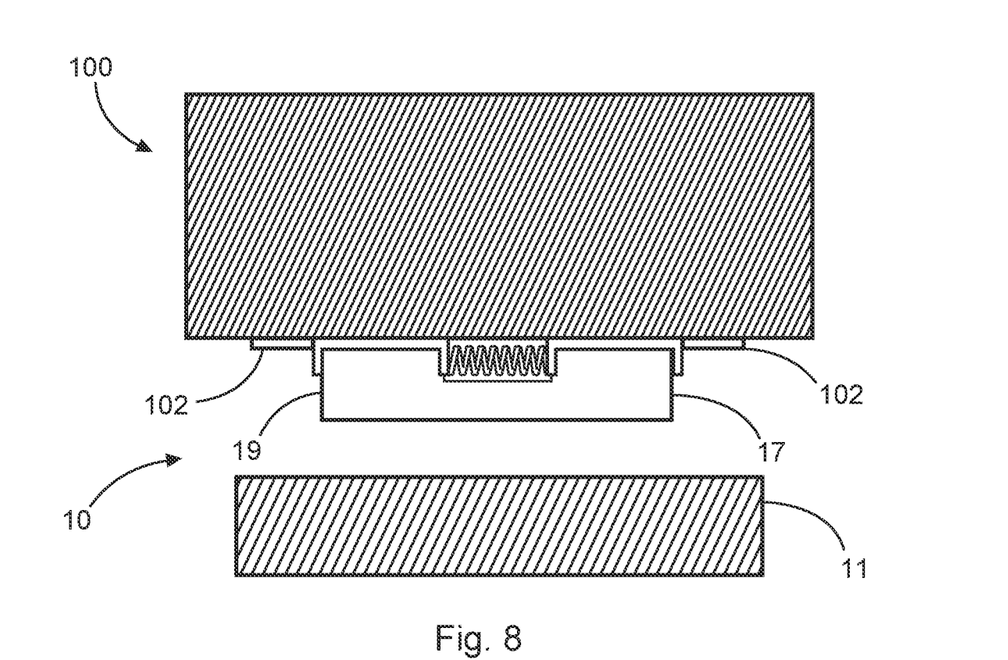
FIG. 8 is a schematic view of a fixture unit with a skirt element in the curing position according to a further example of the present disclosure.

FIG. 8 is a schematic view of a fixture unit 10 with a skirt element 11 in the curing position according to a further example of the present disclosure. In this example, the grip element is provided by a gripper block element 17 configured to be position between the two terminal elements 102 of a battery cell 100 such that the battery cell 100 can be gripped by the gripper block element 17. In an example, the gripper tong element 17 including two spring elements 19 or other means providing a corresponding force load for gripping the gripper block element 17 between the terminal elements 102 of the battery cell 100.

It should be noted that the present disclosure is not limited to the use of identical grip elements at one fixture unit 10. Rather, the grip elements shown in FIGS. 3 to 8 may also be combined, e.g. a fixture unit 10 may include one tong elements 12 and one gripper tong element 13 or any other combination of the shown grip elements 12, 13, 14, 16, 17.

Figure 9:
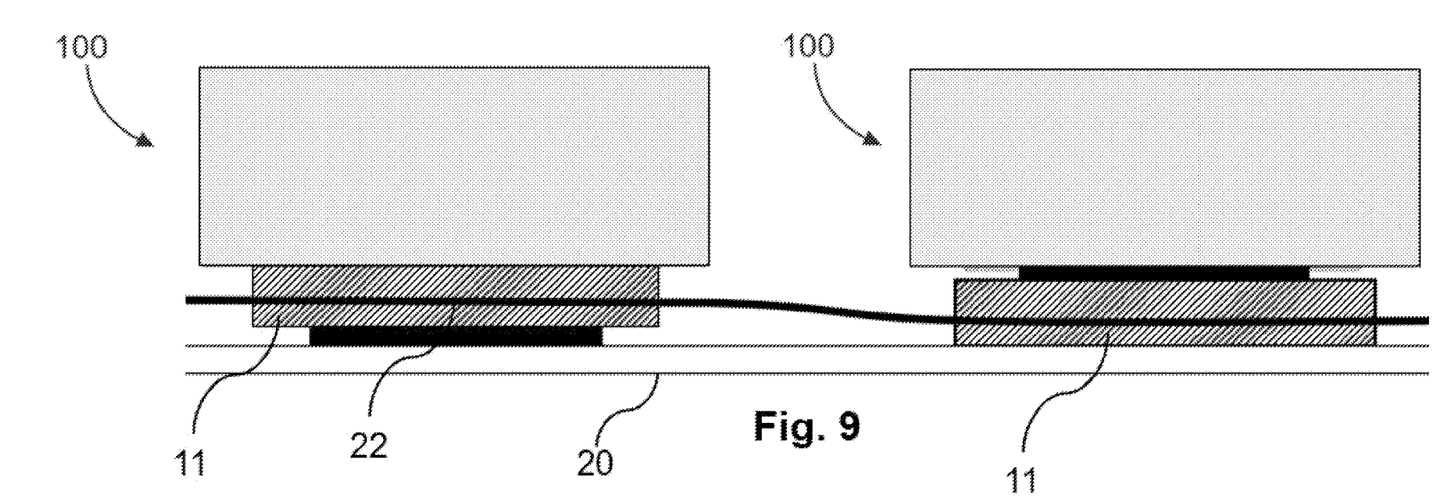
FIG. 9 is a schematic view of a fixture unit and a battery cell during coating and curing.
Figure 10:
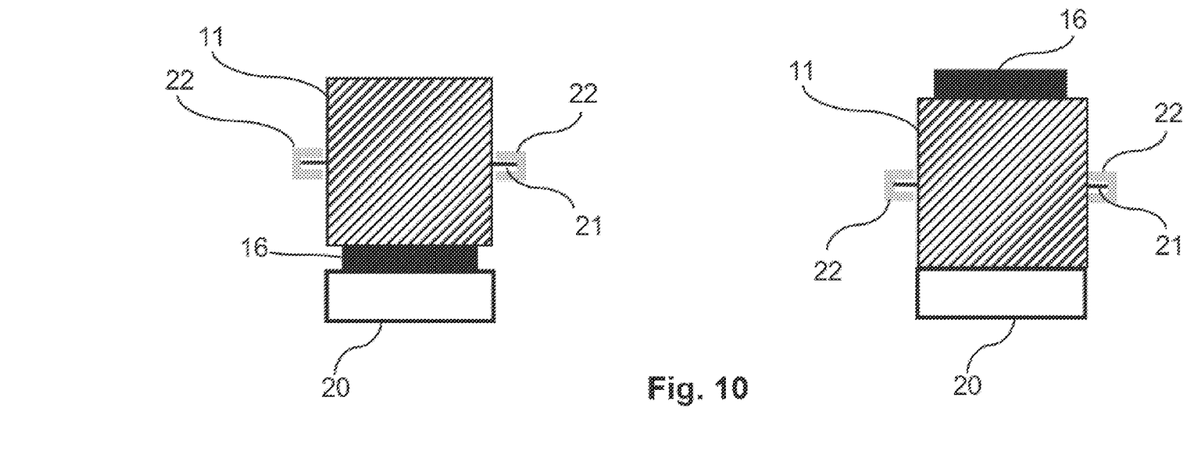
FIG. 10 is a schematic cross-sectional view of the fixture unit shown in FIG. 9 during coating and curing.
Figure 11:
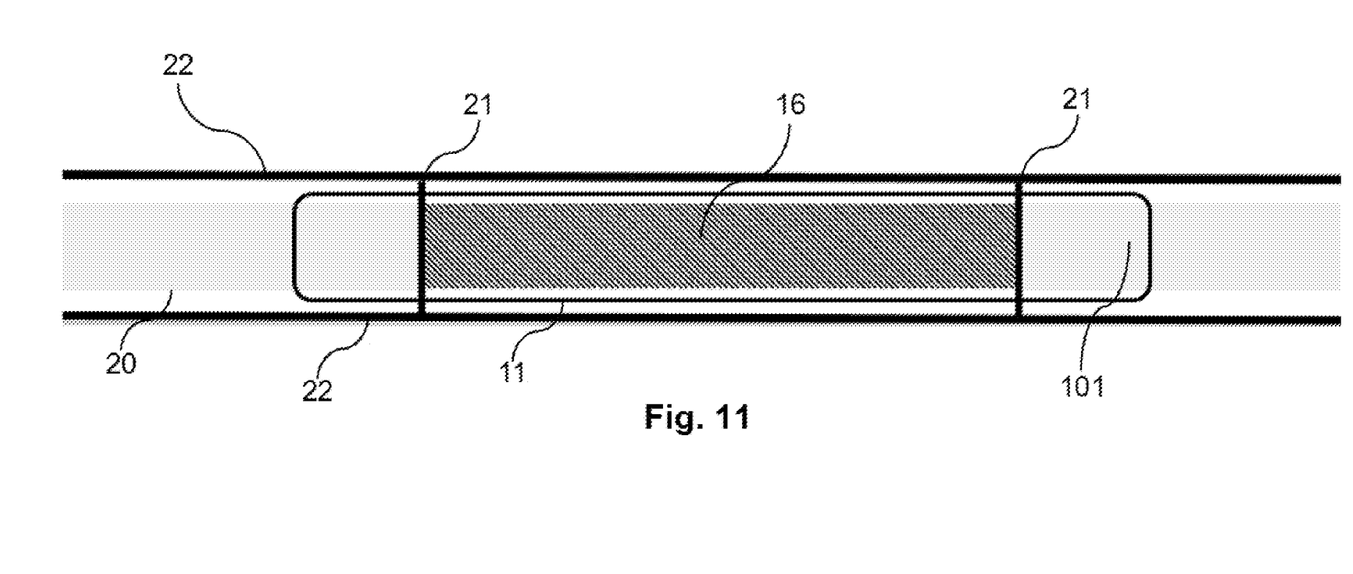
FIG. 11 is a schematic top view onto the fixture unit shown in FIG. 9.

FIG. 9 is a schematic view of a fixture unit 10 and a battery cell 100 during coating and curing. FIG. 10 is a schematic cross-sectional view of the fixture unit 100 during coating and curing. FIG. 10 is a schematic top view onto the fixture unit 10. In the shown example, the grip element of the fixture unit is provided by a block element 16 (cf. FIG. 7) configured to be positioned between the two terminal elements 102 of the battery cell 100 such that the battery cell 100 can be held or supported by the block element 16. As shown, the block element 16 may be configured in such a way that the battery cell 100 rests on the block element 16, e.g. without contacting the terminal elements 102 of the battery cell 100, wherein the block element 16 may also be designed in such a way that the block element 100 is frictionally clamped/arranged or form-fitted between the terminal elements 102 of the battery cell 100.

In the shown example, the fixture unit 10 and the thereon arranged battery cell 100 is arranged/mounted on a moving belt 20 which may move the fixture unit 10 and the battery cell 100 through a spray booth/station where the battery cell may be sprayed with a coating and through a curing station where the applied coating is cured, e.g. by means of UV-light. In the shown example, the block element 16 is arranged/mounted on the moving belt 20. In FIGS. 9 and 10, the first positions at the left side, is the coating position where the skirt element 11 is in contact with the battery cell 100 shielding/covering the area 101 of the battery cell 100 which should not be coated. At the second shown positions at the right side, the skirt element 11 is position in its curing position where the skirt element 11 is arranged at a distance from the battery cell 100, wherein distance of the skirt element 11 to the battery cell 100 is approximately 10 mm. This distance is adjusted in such a way that the curing means, e.g. UV light, may reach the applied coating also near the area 101 of the battery cell 100. As shown, the area 101 of the battery cell 100 that is not to be coated is located at the bottom.

In the shown example, the skirt element 11 may include two or more guide pins 21 which are configured to engage with one or two rail elements 22 arranged above the moving belt 20 and lateral to the fixture unit 10. The two guide pins 21 may be provided at the lateral sides of the skirt element 11 and which may be guided through the skirt element 11 so that they come into contact with the block element 16 (cf. FIG. 10). Thereby, the block element 16 engaged with the guide pins 21 causing the skirt element 11 to follow the linear movement of the block element 16, which is driven by the moving belt 20. Moreover, the guide pins 21 may be guided by means of the rail elements 22 allowing the skirts element 10 to move up and down between its coating position and curing position.

The present disclosure has been described in conjunction with a preferred example as examples as well. However, other variations can be understood and effected by those persons skilled in the art and practicing the claimed invention, from the studies of the drawings, this disclosure and the claims. Notably, in particular, any steps presented can be performed in any order, i.e. the present invention is not limited to a specific order of these steps. Moreover, it is also not required that the different steps are performed at a certain place.

In the claims as well as in the description the word "comprising" does not exclude other elements or steps and the indefinite article "a" or "an" does not exclude a plurality. "can" or "may" refers to optional features. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A fixture unit for holding a prismatic battery cell during a coating step and during a curing step, comprising:
    at least one skirt element, which is movable between a coating position and a curing position and wherein the skirt element is configured to shield an area of the battery cell in the coating position and to un-shield the area of the battery cell in the curing position; and
    at least one grip element configured to hold the battery cell during the coating step and the curing step, wherein the grip element is configured to hold the battery cell in an area that is shielded by the skirt element in its coating position such that the at least one skirt element is configured to shield the at least one grip element in the coating position.

2. The fixture according to claim 1, wherein in its coating position, the skirt element is in contact with the battery cell and in its curing position, the skirt element is positioned at a distance from the battery cell.

3. The fixture unit according to claim 1, wherein the grip element is provided by at least one tong element comprising a receptacle which is configured to house and/or support a protruding terminal element of the battery cell.

4. The fixture unit according to claim 1, wherein the grip element comprises at least one gripper tong element configured to grip a protruding terminal element of the battery cell.

5. The fixture unit according to claim 1, wherein the grip element comprises at least one suction mechanism comprising at least one suction cup configured to hold the battery cell.

6. The fixture unit according to claim 1, wherein the grip element comprises at least one block element configured to be positioned between two terminal elements of the battery cell such that the battery cell is held or supported by the at least one block element.

7. The fixture unit according to claim 1, wherein the grip element comprises at least one gripper block element configured to be positioned between two terminal elements of the battery cell such that the battery cell is gripped by the at least one gripper block element.

8. The fixture unit according to claim 1, wherein the fixture unit comprises at least two grip elements.

9. The fixture unit according to claim 1, wherein the skirt element is configured to mask a rectangular area of a side of the battery cell, where the terminal element and other features of the battery cell are arranged.

10. The fixture unit according to claim 1, wherein the skirt element has a rectangular cross section having a length between 60 mm and 540 mm, and a width between 10 mm and 50 mm, and/or the fixture unit is configured to hold a prismatic battery cell having a length between 100 mm and 600 mm, a width between 10 mm and 50 mm, and a height between 80 mm and 150 mm.

11. The fixture unit according to claim 1, further comprising a moving mechanism configured to move the skirt element between the coating position and the curing position.

12. A method for coating a prismatic battery cell, comprising:
    providing a battery cell held by a fixture unit, comprising:
        at least one skirt element, which is movable between a coating position and a curing position and wherein the skirt element is configured to shield an area of the battery cell in the coating position and to un-shield the area of the battery cell in the curing position; and
        at least one grip element configured to hold the battery cell during the coating step and the curing step, wherein the grip element is configured to hold the battery cell in an area that is shielded by the skirt element in its coating position;
    positioning the skirt element in a coating position such that the at least one skirt element shields the at least one grip element;
    coating the battery cell with a coating;
    positioning the skirt element in a curing position; and
    curing the coating.

* * * * *